United States Patent
Huang et al.

(10) Patent No.: US 10,838,825 B2
(45) Date of Patent: Nov. 17, 2020

(54) IMPLEMENTING SNAPSHOT SETS FOR CONSISTENCY GROUPS OF STORAGE VOLUMES

(71) Applicant: EMC IP Holding Company LLC, Hopkinton, MA (US)

(72) Inventors: Jia Huang, Chengdu (CN); Bernie Hu, Chengdu (CN); Jessica Jing Ye, Chengdu (CN); Olivia Juan Huang, Chengdu (CN); Jennifer Lifeng Zheng, Chengdu (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 191 days.

(21) Appl. No.: 15/991,262

(22) Filed: May 29, 2018

(65) Prior Publication Data
US 2019/0332499 A1   Oct. 31, 2019

(30) Foreign Application Priority Data
Apr. 27, 2018   (CN) ............ 2018 1 0390779

(51) Int. Cl.
*G06F 11/14* (2006.01)
*G06F 3/06* (2006.01)

(52) U.S. Cl.
CPC ........ *G06F 11/1464* (2013.01); *G06F 3/0604* (2013.01); *G06F 3/0614* (2013.01); *G06F 3/0631* (2013.01); *G06F 3/0659* (2013.01); *G06F 3/0689* (2013.01); *G06F 11/1451* (2013.01); *G06F 2201/82* (2013.01); *G06F 2201/84* (2013.01)

(58) Field of Classification Search
CPC .... G06F 3/0631; G06F 3/0689; G06F 3/0659; G06F 3/0604; G06F 11/1464; G06F 11/1446; G06F 11/1451; G06F 11/1461; G06F 3/0614
USPC ............... 711/162, 170, E12.001, E12.103, 711/E12.002, 154, 103, 165
See application file for complete search history.

(56) References Cited

U.S. PATENT DOCUMENTS

| | | |
|---|---|---|
| 7,761,456 B1 * | 7/2010 | Cram ............. G06F 11/1469 707/754 |
| 8,850,145 B1 | 9/2014 | Haase et al. |
| 9,047,169 B1 | 6/2015 | Haase et al. |

(Continued)

*Primary Examiner* — Daniel C. Chappell
*Assistant Examiner* — Edward Waddy, Jr.
(74) *Attorney, Agent, or Firm* — BainwoodHuang

(57) ABSTRACT

Techniques for implementing snapshot sets for consistency groups of storage volumes in data storage systems. For each snapshot in a snapshot set of a consistency group, metadata is expanded to include a snapshot set identifier, and a consistency group identifier. The data structure of the consistency group is enhanced to include a snapshot set list, which includes the snapshot set identifier(s) of the consistency group, and a pointer to a storage volume list that contains names of storage volumes with snapshots in the snapshot set(s). By expanding the metadata of each snapshot in a snapshot set, and enhancing the data structure of each consistency group with snapshot set(s), relationships between snapshots, snapshot sets, consistency groups, and storage volumes can be readily maintained, allowing storage volumes to be added to and/or removed from consistency groups without having to delete snapshots of the storage volumes and/or snapshot sets of the consistency groups.

17 Claims, 10 Drawing Sheets

(56) References Cited

U.S. PATENT DOCUMENTS

| | | | |
|---|---|---|---|
| 9,063,892 B1 | 6/2015 | Taylor et al. | |
| 9,075,755 B1 | 7/2015 | Haase et al. | |
| 9,218,138 B1 | 12/2015 | Haase et al. | |
| 10,025,843 B1 | 7/2018 | Meiri et al. | |
| 2015/0032982 A1* | 1/2015 | Talagala | G06F 3/0619 |
| | | | 711/162 |
| 2018/0225052 A1* | 8/2018 | Rogers | G06F 3/067 |
| 2018/0260119 A1* | 9/2018 | Atia | G06F 3/0604 |

* cited by examiner

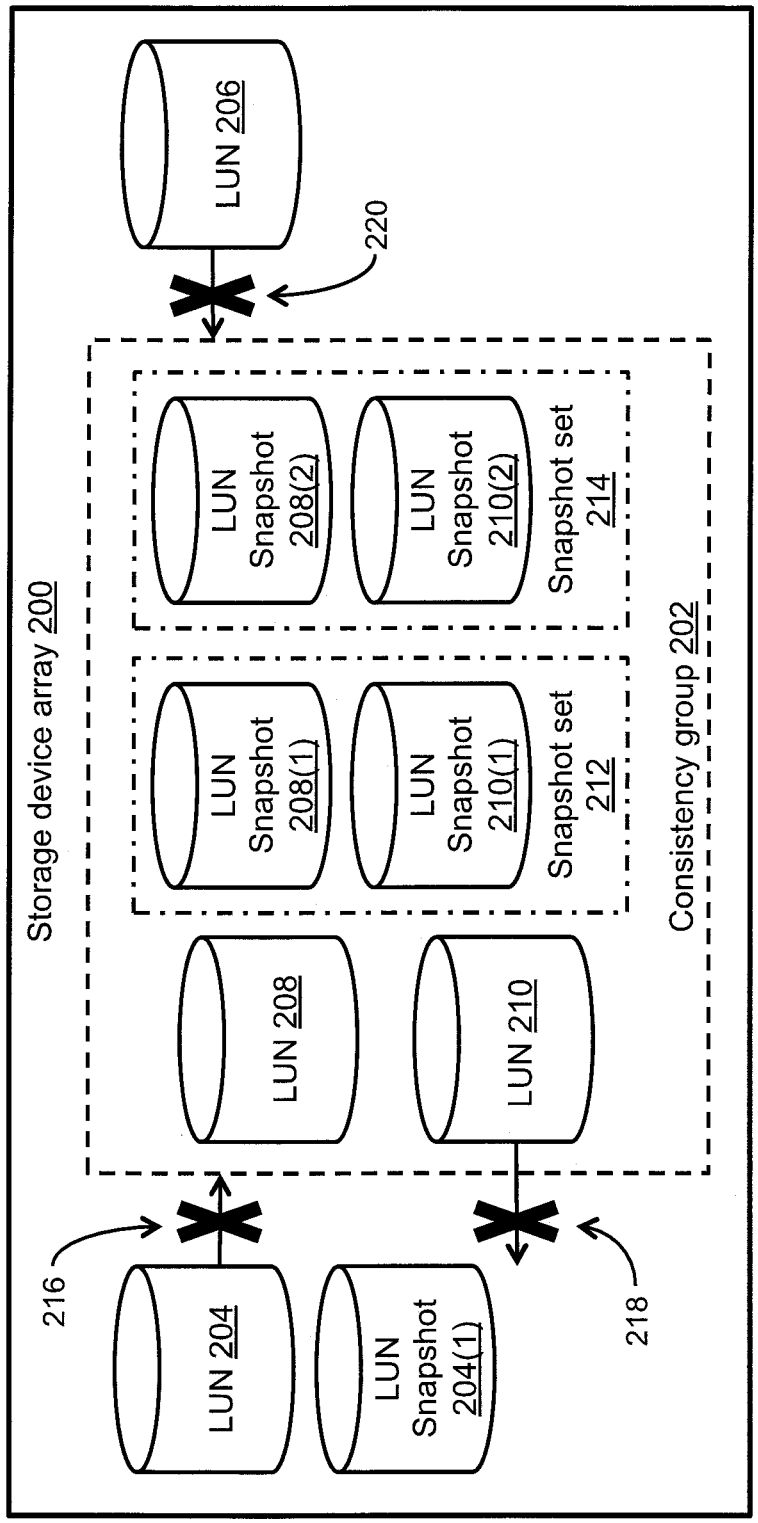
Fig. 2 – Prior art

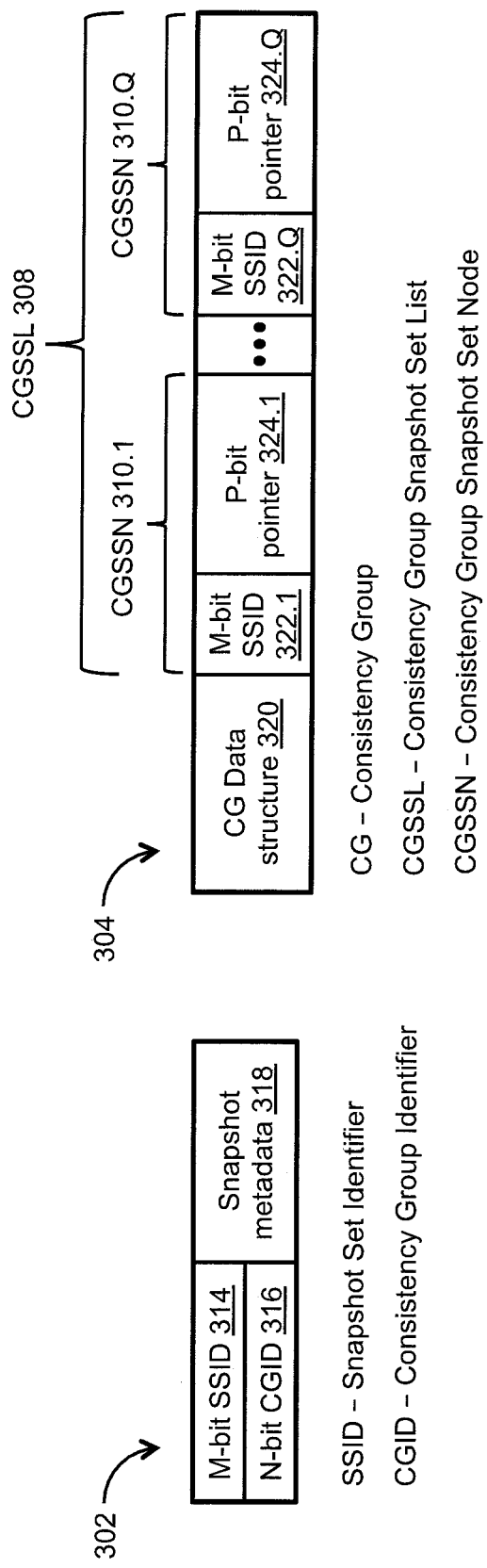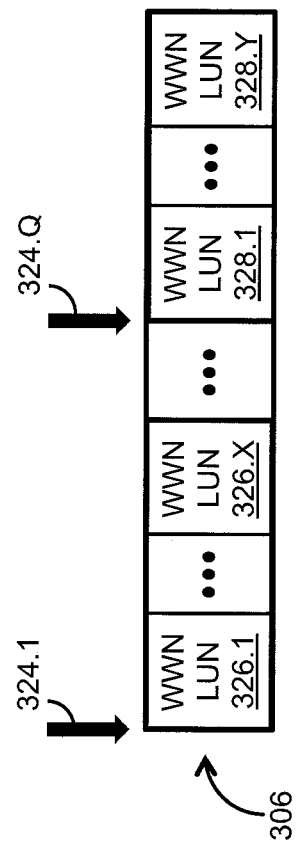
Fig. 3a
Fig. 3b
Fig. 3c

IMPLEMENTING SNAPSHOT SETS FOR CONSISTENCY GROUPS OF STORAGE VOLUMES

BACKGROUND

Conventional data storage systems create snapshots of storage volumes at certain points-in-time (PITs) for a variety of purposes, including, but not limited to, backing-up volumes of data, providing operational and/or disaster recovery, improving application availability, and reducing data management costs. Such snapshots of storage volumes are typically used to record states of the data storage systems, as well as provide point-in-time (PIT) views of consistency groups, which represent sets of storage volumes of applications stored on storage appliances within the data storage systems. By maintaining consistency among data stored on the sets of storage volumes of the consistency groups, such applications can successfully recover from failures (e.g., database errors, etc.) using consistent data for the storage volumes at one or more PITs of the data storage systems. Such consistent data for the storage volumes can also be used for data recovery in the event an accident, a disaster, or other catastrophic failure causes data at a production site to be lost.

SUMMARY

In conventional data storage systems, storage appliances can store snapshots of storage volumes at certain PITs of the data storage systems, as well as store sets of snapshots (also referred to herein as "snapshot set(s)") of storage volumes within consistency groups at the respective PITs. However, maintaining storage volumes with one or more associated snapshots and/or consistency groups with one or more associated snapshot sets on such conventional data storage systems can restrict the data storage systems' ability to add storage volumes to the consistency groups, as well as remove storage volumes from the consistency groups. For example, in order to add a storage volume that has one or more associated snapshots to a consistency group, a conventional data storage system must typically delete all of the snapshots of the storage volume before adding the storage volume to the consistency group. Further, in order to add a storage volume to (or remove a storage volume from) a consistency group that has one or more associated snapshot sets, the conventional data storage system must typically delete all of the snapshot sets of the consistency group before adding the storage volume to (or removing the storage volume from) the consistency group. However, having to delete snapshots and/or snapshot sets before adding storage volumes to (or removing storage volumes from) consistency groups can reduce the amount of consistent data available to the data storage system, adversely affecting the data storage system's ability to achieve data recovery in the event of an accident, a disaster, or other catastrophic failure.

Techniques are disclosed herein for implementing snapshot sets for consistency groups of storage volumes in data storage systems. The disclosed techniques employ expanded metadata for snapshots of storage volumes stored on the data storage systems, as well as enhanced data structures for consistency groups of the storage volumes. For each snapshot of a storage volume in a snapshot set of a consistency group, the snapshot metadata is expanded to include an identifier of the snapshot set (also referred to herein as the "snapshot set identifier" or "SSID"), and an identifier of the consistency group (also referred to herein as the "consistency group identifier" or "CGID"). The data structure of the consistency group is enhanced to include a snapshot set list (also referred to herein as the "consistency group snapshot set list" or "CGSSL"), which includes the SSID of each snapshot set of the consistency group, and a pointer to a storage volume list that contains one or more names of storage volumes with associated snapshots in the snapshot set. By expanding the metadata of each snapshot of a storage volume in a snapshot set of a consistency group, and enhancing the data structure of each consistency group with one or more associated snapshot sets, relationships among snapshots, snapshot sets, consistency groups, and storage volumes can be more readily maintained in a data storage system, thereby allowing storage volumes to be added to and/or removed from consistency groups without first having to delete snapshots of the storage volumes and/or snapshot sets of the consistency groups.

In certain embodiments, a method of implementing snapshot sets for consistency groups of storage volumes in a data storage system includes forming a consistency group of storage volumes on the data storage system. The consistency group has a data structure. The method further includes creating, at a first point-in-time (PIT), a first set of snapshots of the storage volumes in the consistency group, and generating first snapshot metadata for each snapshot in the first set of snapshots. The first snapshot metadata includes an identifier of the first set of snapshots and an identifier of the consistency group. The method still further includes incorporating a snapshot set list including a first snapshot set node into the data structure of the consistency group. The first snapshot set node includes the identifier of the first set of snapshots and a first pointer to a first storage volume list of the storage volumes having the respective snapshots in the first set of snapshots. The method yet further includes performing at least one of (i) adding an additional storage volume to the consistency group, and (ii) removing a respective storage volume from among the storage volumes in the consistency group, without deleting any of the snapshots in the first set of snapshots in the consistency group.

In certain aspects, the method includes, having added the additional storage volume to the consistency group, creating, at a second PIT, a second set of snapshots of the storage volumes including the additional storage volume in the consistency group, and generating second snapshot metadata for each snapshot in the second set of snapshots. The second snapshot metadata includes an identifier of the second set of snapshots and the identifier of the consistency group. The method further includes adding a second snapshot set node to the snapshot set list. The second snapshot set node includes an identifier of the second set of snapshots and a second pointer to a second storage volume list of storage volumes having the respective snapshots in the second set of snapshots.

In certain further aspects, a snapshot of the additional storage volume is stored on the data storage system outside of the consistency group. The method further includes, having added the additional storage volume to the consistency group, allowing only read requests or delete requests pertaining to the snapshot of the additional storage volume to be acted upon by the data storage system.

In certain other aspects, the method includes, having removed the respective storage volume from among the storage volumes in the consistency group, allowing only read requests pertaining to the snapshot of the respective storage volume to be acted upon by the data storage system. The method further includes deleting the snapshot of the respective storage volume in the event that (i) the first set of snapshots is deleted, refreshed, or restored, (ii) the consistency group is removed from the data storage system, or (iii) the respective storage volume is removed from the data storage system. The respective storage volume is initially stored on the data storage system outside of the consistency group. The method still further includes subsequently removing the respective storage volume from the data storage system. Before removing the respective storage volume from the data storage system, the first snapshot metadata for the snapshot of the respective storage volume is accessed to obtain the identifier of the first set of snapshots and the identifier of the consistency group. The method yet further includes (i) having obtained the identifier of the first set of snapshots and the identifier of the consistency group, accessing the first snapshot set node of the snapshot set list incorporated into the data structure of the consistency group, (ii) accessing the first storage volume list using the first pointer included in the first snapshot set node, (iii) deleting a name of the respective storage volume from the first storage volume list, and (iv) deleting the snapshot of the respective storage volume from the consistency group, and deleting the first snapshot metadata for the snapshot of the respective storage volume.

In certain additional aspects, the method includes forming a second consistency group of storage volumes on the data storage system. The second consistency group has a second data structure. The method further includes creating, at a second PIT, a second set of snapshots of the storage volumes in the second consistency group, and generating second snapshot metadata for each snapshot in the second set of snapshots. The second snapshot metadata includes an identifier of the second set of snapshots and an identifier of the second consistency group. The method still further includes incorporating a second snapshot set list including a snapshot set node into the second data structure of the second consistency group. The snapshot set node includes the identifier of the second set of snapshots and a second pointer to a second storage volume list of the storage volumes having the respective snapshots in the second set of snapshots.

In certain further embodiments, a system for implementing snapshot sets for consistency groups of storage volumes in a data storage system includes at least one memory, and at least one processor operative to execute instructions out of the at least one memory to form a consistency group of storage volumes on the data storage system. The consistency group has a data structure. The processor is further operative to execute the instructions out of the memory to create, at a first point-in-time (PIT), a first set of snapshots of the storage volumes in the consistency group, and to generate first snapshot metadata for each snapshot in the first set of snapshots. The first snapshot metadata includes an identifier of the first set of snapshots and an identifier of the consistency group. The processor is still further operative to execute the instructions out of the memory to incorporate a snapshot set list including a first snapshot set node into the data structure of the consistency group. The first snapshot set node includes the identifier of the first set of snapshots and a first pointer to a first storage volume list of the storage volumes having the respective snapshots in the first set of snapshots. The processor is yet further operative to execute the instructions out of the memory to perform at least one of (i) adding an additional storage volume to the consistency group, and (ii) removing a respective storage volume from among the storage volumes in the consistency group, without deleting any of the snapshots in the first set of snapshots in the consistency group.

Other features, functions, and aspects of the invention will be evident from the Detailed Description that follows.

BRIEF DESCRIPTION OF THE DRAWINGS

The foregoing and other objects, features, and advantages will be apparent from the following description of particular embodiments of the invention, as illustrated in the accompanying drawings, in which like reference characters refer to the same parts throughout the different views.

FIG. 2 is a block diagram of a storage device array of a conventional data storage system, which has a restricted ability to add storage volumes to (and remove storage volumes from) consistency groups;

FIG. 3a is a diagram of exemplary expanded metadata for a snapshot of a storage volume in a snapshot set of a consistency group stored on the data storage system of FIG. 1;

FIG. 3b is a diagram of an exemplary enhanced data structure for the consistency group of FIG. 3a;

FIG. 3c is a diagram of a snapshot set list for the consistency group of FIG. 3a;

DETAILED DESCRIPTION

Techniques are disclosed herein for implementing snapshot sets for consistency groups of storage volumes in data storage systems. The disclosed techniques employ expanded metadata for snapshots of storage volumes stored on the data storage systems, as well as enhanced data structures for consistency groups of the storage volumes. For each snapshot of a storage volume in a snapshot set of a consistency group, the snapshot metadata is expanded to include an identifier of the snapshot set (also referred to herein as the "snapshot set identifier" or "SSID"), and an identifier of the consistency group (also referred to herein as the "consistency group identifier" or "CGID"). The data structure of the consistency group is enhanced to include a snapshot set list (also referred to herein as the "consistency group snapshot set list" or "CGSSL"), which includes the SSID of each snapshot set of the consistency group, and a pointer to a storage volume list that contains one or more names of storage volumes with associated snapshots in the snapshot set. By expanding the metadata of each snapshot of a storage volume in a snapshot set of a consistency group, and enhancing the data structure of each consistency group with one or more associated snapshot sets, relationships among snapshots, snapshot sets, consistency groups, and storage volumes can be more readily maintained in a data storage system, thereby allowing storage volumes to be added to and/or removed from consistency groups without first having to delete snapshots of the storage volumes and/or snapshot sets of the consistency groups.

Figure 1:
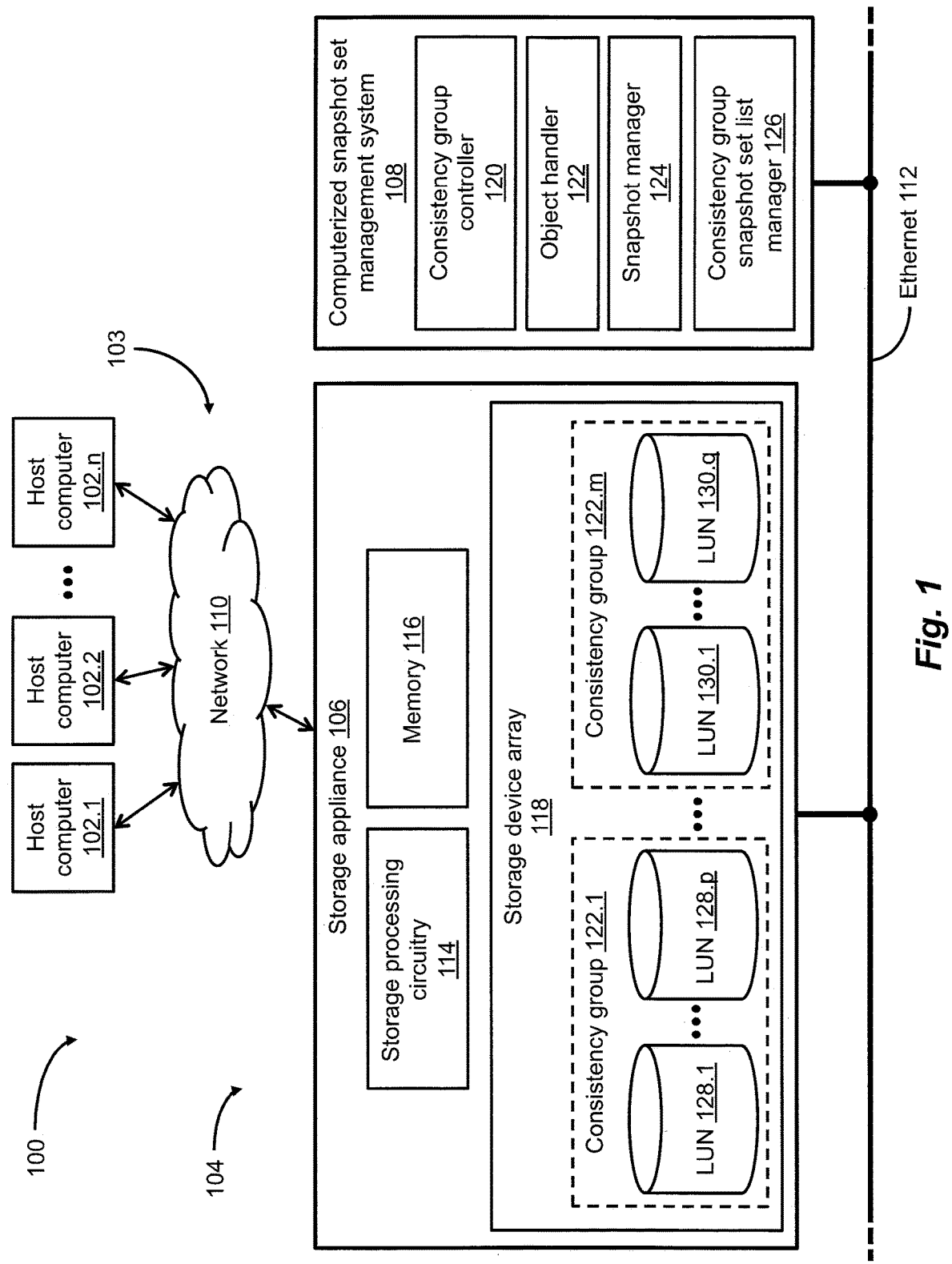
FIG. 1 is a block diagram of a data storage environment, in which an exemplary data storage system configured to implement snapshot sets for consistency groups of storage volumes can be employed.

FIG. 1 depicts an illustrative embodiment of a data storage environment 100, in which an exemplary data storage system 104 configured to implement snapshot sets for consistency groups of storage volumes can be employed. As shown in FIG. 1, the data storage environment 100 includes a plurality of host computers 102.1, 102.2, . . . , 102.n communicably coupled to the data storage system 104 by a communications medium 103 that includes a network 110. For example, each of the plurality of host computers 102.1, 102.2, . . . , 102.n can be configured as a web server computer, a file server computer, an email server computer, an enterprise server computer, a database server, and/or any other suitable computer or computerized device, for providing input/output (IO) requests (e.g., small computer system interface (SCSI) commands) to the data storage system 104 over the communications medium 103. Such IO requests (e.g., write requests, read requests, delete requests) provided by the plurality of host computers 102.1, 102.2, . . . , 102.n can direct the data storage system 104 to store and/or retrieve blocks of data to/from storage volumes (e.g., logical unit numbers (LUNs), virtual volumes (VVOLs)) on behalf of the respective host computers 102.1, 102.2, . . . , 102.n.

The communications medium 103 can be configured to interconnect the plurality of host computers 102.1, 102.2, . . . , 102.n with the data storage system 104 to enable them to communicate and exchange electronic signals. As shown in FIG. 1, at least a portion of the communications medium 103 is illustrated as a "cloud" to indicate that the communications medium 103 can have a variety of different topologies including, but not limited to, backbone, hub-and-spoke, loop, irregular, or any suitable combination thereof. The communications medium 103 can also include, but is not limited to, copper-based data communications devices and cabling, fiber optic devices and cabling, wireless devices, or any suitable combination thereof. In addition, the communications medium 103 can be configured to support storage area network (SAN)-based communications, local area network (LAN)-based communications, cellular communications, wide area network (WAN)-based communications, distributed infrastructure communications, and/or any other suitable communications.

As shown in FIG. 1, the data storage system 104 can include at least one storage appliance 106 and a computerized snapshot set management system 108, each of which can be coupled to an Ethernet sub-network 112 or any other suitable network and/or sub-network. The storage appliance 106 can include storage processing circuitry 114, at least one memory 116, and at least one storage device array 118. The storage processing circuitry 114 can include one or more physical storage processors or engines, data movers, director boards, blades, IO modules, storage drive controllers, switches, and/or any other suitable computer hardware or combination thereof. The storage processing circuitry 114 in association with the memory 116 can be configured to process IO requests from one or more of the host computers 102.1, 102.2, . . . , 102.n, and store host data in a redundant array of independent disk (RAID) environment implemented by the storage device array 118. In certain embodiments, the storage processing circuitry 114 and the memory 116 can be configured to process such IO requests, and store the host data in a cloud-based storage environment or any other suitable data storage environment. The memory 116 can include persistent memory storage (e.g., flash memory, magnetic memory) and/or non-persistent cache memory storage (e.g., dynamic random access memory (DRAM), static random access memory (SRAM)), and accommodate a variety of software constructs including, but not limited to, operating system code and data, data storage system code and data, and snapshot set implementation code, data, and metadata. The storage device array 118 can store a plurality of storage volumes 128.1, . . . , 128.p, 130.1, . . . , 130.q, each of which can be implemented as a LUN, a VVOL, or any other suitable storage unit or volume.

As further shown in FIG. 1, the computerized snapshot set management system 108 can include a consistency group controller 120, an object handler 122, a snapshot manager 124, and a consistency group snapshot set list manager 126, each of which can be implemented on the computerized snapshot set management system 108 using any suitable computer or processing hardware, software, or combination thereof. The consistency group controller 120 can be configured to manage operations of the object handler 122, the snapshot manager 124, and/or the consistency group snapshot set list manager 126 for managing snapshots of storage volumes, managing snapshot sets of storage volumes within consistency groups, as well as providing an application programming interface (API) for communicating with the storage appliance 106. The object handler 122 can be configured, under the direction of the consistency group controller 120, to create objects (e.g., LUNs, VVOLs, snapshots, snapshot sets), to modify objects, to delete objects, to add objects to consistency groups, to remove objects from consistency groups, and/or to obtain properties (e.g., identifiers, names) of objects stored on the storage device array 118 of the storage appliance 106. The snapshot manager 124 can be configured, under the direction of the consistency group controller 120, to manage creation, modification, and/or deletion of expanded metadata for snapshots of storage volumes (e.g., LUNs, VVOLs) created by the object handler 122. The consistency group snapshot set list manager 126 can be configured, under the direction of the consistency goup controller 120, to manage one or more snapshot set lists and storage volume lists for each consistency group of storage volumes stored on the storage device array 118. The storage device array 118 can include one or more consistency groups 122.1, . . . , 122.m, such as the consistency group 122.1 for the plurality of storage volumes 128.1, . . . , 128.p and the consistency group 122.m for the plurality of storage volumes 130.1, . . . , 130.q.

As employed herein, the term "snapshot" refers to a point-in-time (PIT) replication of a storage volume (e.g., LUN, VVOL) or other data object, along with its associated snapshot metadata. Such a snapshot can replicate a full copy of data from a storage volume (e.g., a base LUN), or a space-efficient copy by storing differences between a current version of the data and a prior version of the data at a PIT when a snapshot of the storage volume was last taken. Such space-efficient copies can be used to replicate snapshots on remote data storage systems. As employed herein, the term "snapshot set" refers to one or more snapshots of storage volumes in a consistency group taken at a certain PIT. As employed herein, the term "consistency group" refers to a set of storage volumes stored on a storage appliance, for which consistency among data stored on the storage volumes is desired to be maintained.

FIG. 2 depicts an illustrative embodiment of a storage device array 200 of a storage appliance included in a conventional data storage system, which has a restricted ability to add storage volumes to (and remove storage volumes from) consistency groups. As shown in FIG. 2, the storage device array 200 is configured to store a plurality of storage volumes (e.g., LUNs), namely, a LUN 204, a LUN 206, a LUN 208, and a LUN 210. The LUN 204 has an associated LUN snapshot 204(1) taken at a first PIT. As further shown in FIG. 2, the storage device array 200 maintains the LUN 208 and the LUN 210 provisioned in a consistency group 202, which includes a plurality of snapshot sets, namely, (i) a snapshot set 212 containing a LUN snapshot 208(1) and a LUN snapshot 210(1) of the LUN 208 and the LUN 210, respectively, taken at the first PIT, and (ii) a snapshot set 214 containing a LUN snapshot 208(2) and a LUN snapshot 210(2) of the LUN 208 and the LUN 210, respectively, taken at a second PIT.

The conventional data storage system including the storage device array 200 of FIG. 2 has drawbacks, however, in that its ability to add one or more storage volumes (e.g., LUNs) to the consistency group 202, as well as remove one or more storage volumes (e.g., LUNs) from the consistency group 202, is restricted. For example, in order to add the LUN 204 that has the associated LUN snapshot 204(1) to the consistency group 202, the conventional data storage system must typically delete the LUN snapshot 204(1) from the storage device array 200 before adding the LUN 204 to the consistency group 202. This restricted ability of the conventional data storage system to add the LUN 204 to the consistency group 202 is illustrated by an "X" on a data path corresponding to reference numeral 216. Further, in order to add the LUN 206 to the consistency group 202 that has the snapshot set 212 and the snapshot set 214, the conventional data storage system must typically delete the snapshot set 212 and the snapshot set 214 from the consistency group 202 before adding the LUN 206 to the consistency group 202. This restricted ability of the conventional data storage system to add the LUN 206 to the consistency group 202 is illustrated by an "X" on a data path corresponding to reference numeral 220. Likewise, in order to remove the LUN 210 from the consistency group 202 that has the snapshot set 212 and the snapshot set 214, the conventional data storage system must typically delete the snapshot set 212 and the snapshot set 214 from the consistency group 202 before removing the LUN 210 from the consistency group 202. This further restricted ability of the conventional data storage system to remove the LUN 210 from the consistency group 202 is illustrated by an "X" on a data path corresponding to reference numeral 218. However, having to delete snapshots and/or snapshot sets before adding one or more LUNs to (or removing one or more LUNs from) the consistency group 202 can reduce the amount of consistent data available to the conventional data storage system, adversely affecting the data storage system's ability to achieve data recovery in the event of an accident, a disaster, or other catastrophic failure.

During operation of the data storage system 104 (see FIG. 1), the computerized snapshot set management system 108 can be used to avoid at least some of the restrictions placed on conventional data storage systems while adding one or more storage volumes to (or removing one or more storage volumes from) consistency groups, by employing expanded metadata for snapshots of storage volumes in snapshot sets of the consistency groups, and enhanced data structures for the consistency groups that include the storage volumes and the snapshot sets. For each snapshot of a storage volume in a snapshot set of a consistency group, the computerized snapshot set management system 108 expands the snapshot metadata to include an SSID of the snapshot set, and a CGID of the consistency group containing the snapshot set. Further, the computerized snapshot set management system 108 enhances the data structure of the consistency group to include a snapshot set list (CGSSL), which includes the SSID of each snapshot set of the consistency group, and, for each SSID, a pointer to a storage volume list that contains one or more names of storage volumes with associated snapshots in the snapshot set. By expanding the metadata of each snapshot of a storage volume in a snapshot set of a consistency group, and enhancing the data structure of each consistency group with one or more associated snapshot sets, relationships among snapshots, snapshot sets, consistency groups, and storage volumes can be more readily maintained in the data storage system 104, thereby allowing storage volumes to be added to and/or removed from consistency groups without first having to delete snapshots of the storage volumes and/or snapshot sets of the consistency groups.

FIG. 3a is a diagram of exemplary expanded metadata 302 for a snapshot (also referred to herein as the "expanded snapshot metadata") of a storage volume in a snapshot set of a consistency group stored on the data storage system 104 of FIG. 1. As shown in FIG. 3a, the expanded snapshot metadata 302 includes an M+N bit header consisting of an M-bit SSID 314 and an N-bit CGID 316, in which "M" and "N" can be equal to thirty-two (32) or any other suitable value or different values. The snapshot metadata 318 can include (i) a first timestamp indicating the time when IO requests provided by one or more of the host computers 102.1, 102.2, . . . , 102.*n* were paused at the storage appliance 106 where the snapshot was taken, (ii) a second timestamp indicating the time when the snapshot was taken at the storage appliance 106, and/or any other suitable snapshot metadata.

FIG. 3b is a diagram of an exemplary enhanced data structure 304 for a consistency group (also referred to herein as the "enhanced consistency group data structure") with one or more associated snapshot sets stored on the data storage system 104 of FIG. 1. As shown in FIG. 3b, the enhanced consistency group data structure 304 includes a consistency group (CG) data structure 320, as well as additional entries pertaining to a CGSSL 308, which includes a plurality of consistency group snapshot set nodes 310.1, . . . , 310.Q (also referred to herein as the "CGSSN(s)"). The CGSSL 308 includes a CGSSN 310.1, and so on up to a CGSSN 310.Q, in which "Q" can be any suitable positive integer value. Each of the CGSSN 310.1, . . . , CGSSN 310.Q includes an SSID of a snapshot set of the consistency group, and an address that points to a storage volume list containing one or more names of storage volumes having snapshots in the snapshot set. For example, the CGSSN 310.1 includes an M-bit SSID 322.1 of a first snapshot set of the consistency group, and a P-bit pointer 324.1 to a first storage volume list that contains one or more names of storage volumes with associated snapshots in the first snapshot set; and, the CGSSN 310.Q similarly includes an M-bit SSID 322.Q of a $Q^{th}$ snapshot set of the consistency group, and a P-bit pointer 324.Q to a $Q^{th}$ storage volume list that contains one or more names of storage volumes with associated snapshots in the $Q^{th}$ snapshot set, in which "P" can be equal to sixty-four (64) or any other suitable value. The CG data structure 320 can include entries pertaining to (i) a first set of timestamps indicating the times when IO requests provided by one or more of the host computers 102.1, 102.2, . . . , 102.*n* were paused at the storage appliance 106 where the first through $Q^{th}$ snapshot sets were taken, (ii) a second set of timestamps indicating the times when the first through $Q^{th}$ snapshot sets were taken at the storage appliance 106, and/or any other suitable CG data structure entries.

FIG. 3c is a diagram of "Q" storage volume lists 306 pointed to by the P-bit pointers 324.1, . . . , 324.Q, respectively. As shown in FIG. 3c, the storage volume lists 306 include a first storage volume list pointed to by the P-bit pointer 324.1, and so on up to a $Q^{th}$ storage volume list pointed to by the P-bit pointer 324.Q. The first storage volume list pointed to by the P-bit pointer 324.1 includes a first plurality of names of storage volumes (e.g., WWN LUN 326.1, . . . , WWN LUN 326.X) with associated snapshots in the first snapshot set identified by the M-bit SSID 322.1, and so on up to a $Q^{th}$ plurality of names of storage volumes (e.g., WWN LUN 328.1, . . . , WWN LUN 328.Y) with associated snapshots in the $Q^{th}$ snapshot set identified by the M-bit SSID 322.Q, in which "X" and "Y" can be any suitable positive integer value(s). For example, the names of the storage volumes in the storage volume lists 306 can correspond to endpoint addresses that include worldwide names (WWNs), each of which is a unique identifier (e.g., a node name, a port name) consisting of an 8-byte number, or any other suitable storage volume name or identifier.

Figure 4A:
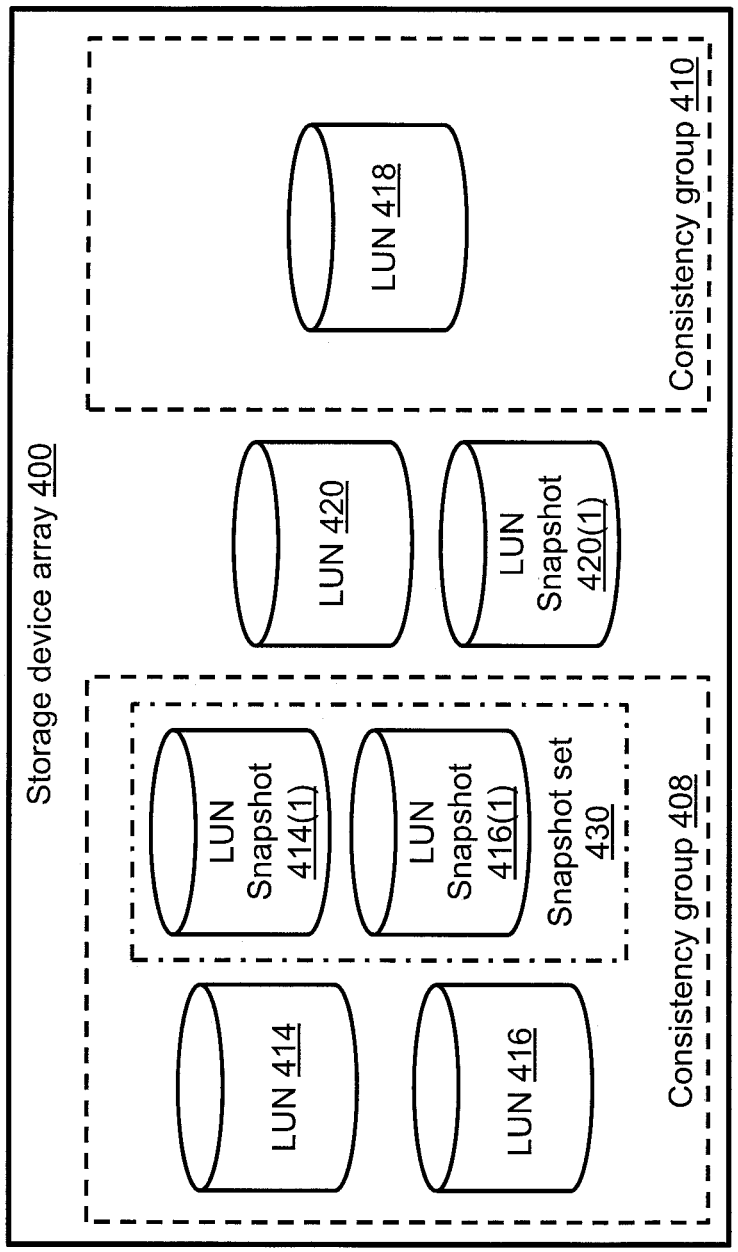
FIGS. 4a, 4b, and 4c are diagrams illustrating exemplary functionality of the data storage system of FIG. 1 for implementing snapshot sets for consistency groups of storage volumes.
Figure 4A:
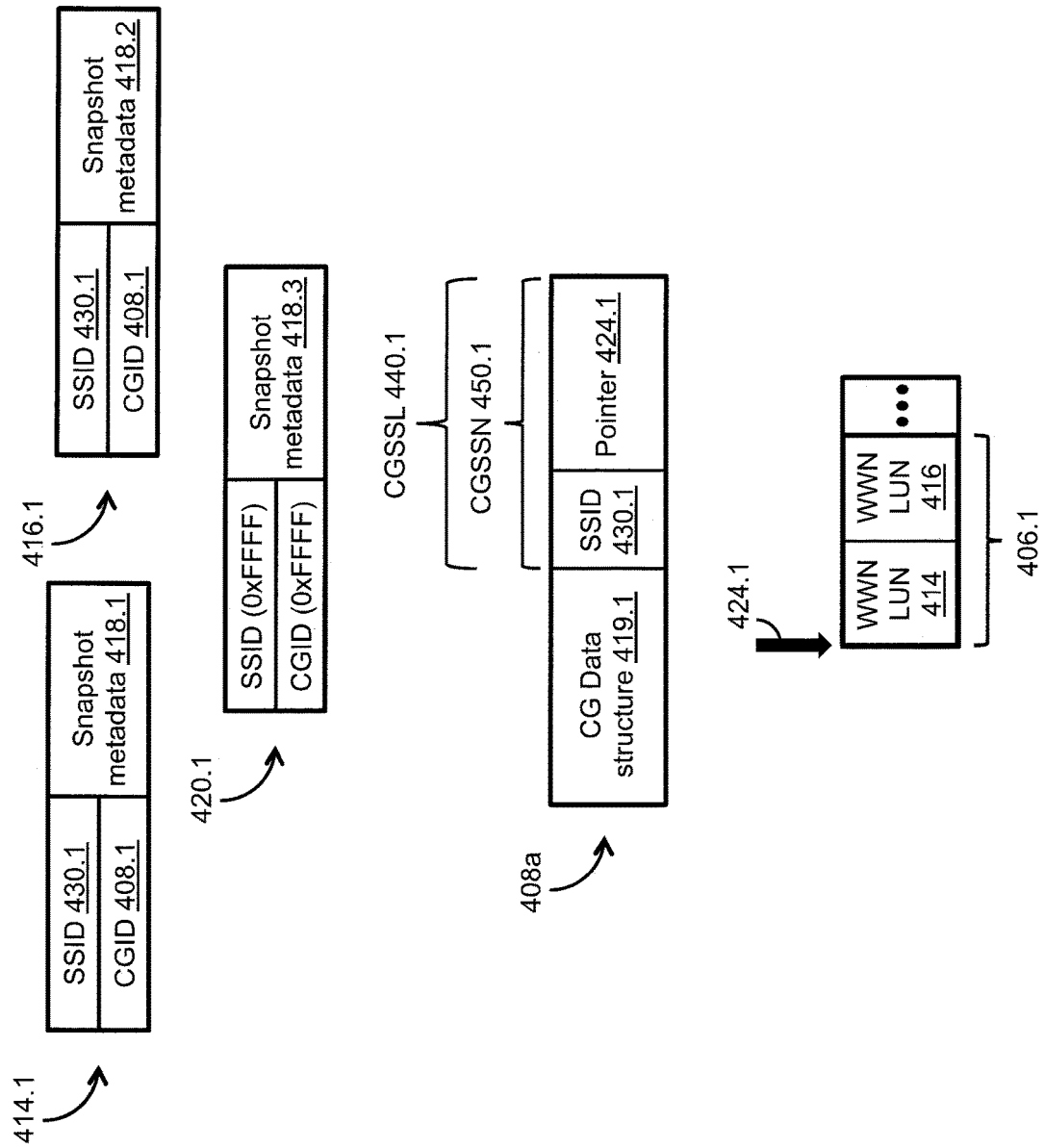
Figure 4B:
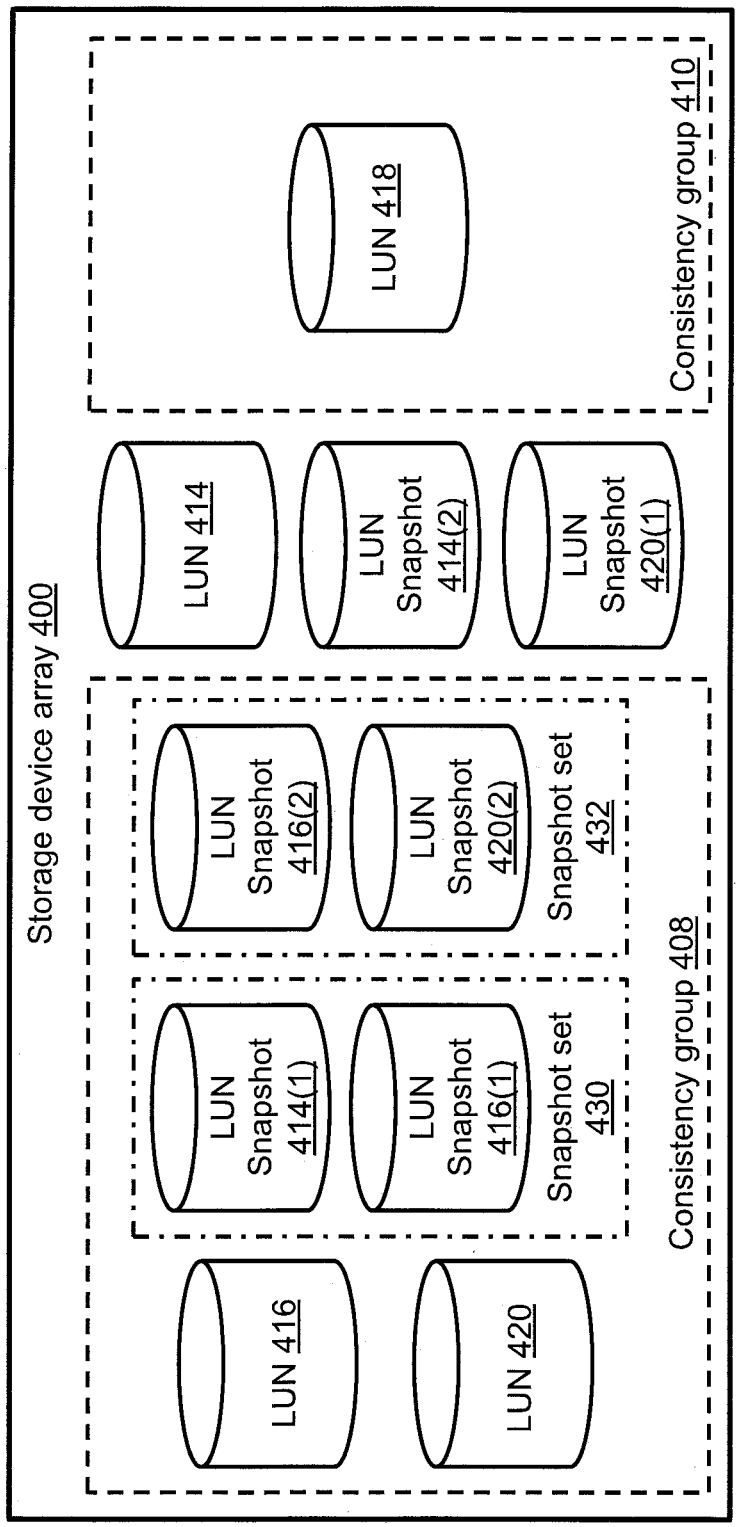
Figure 4B:
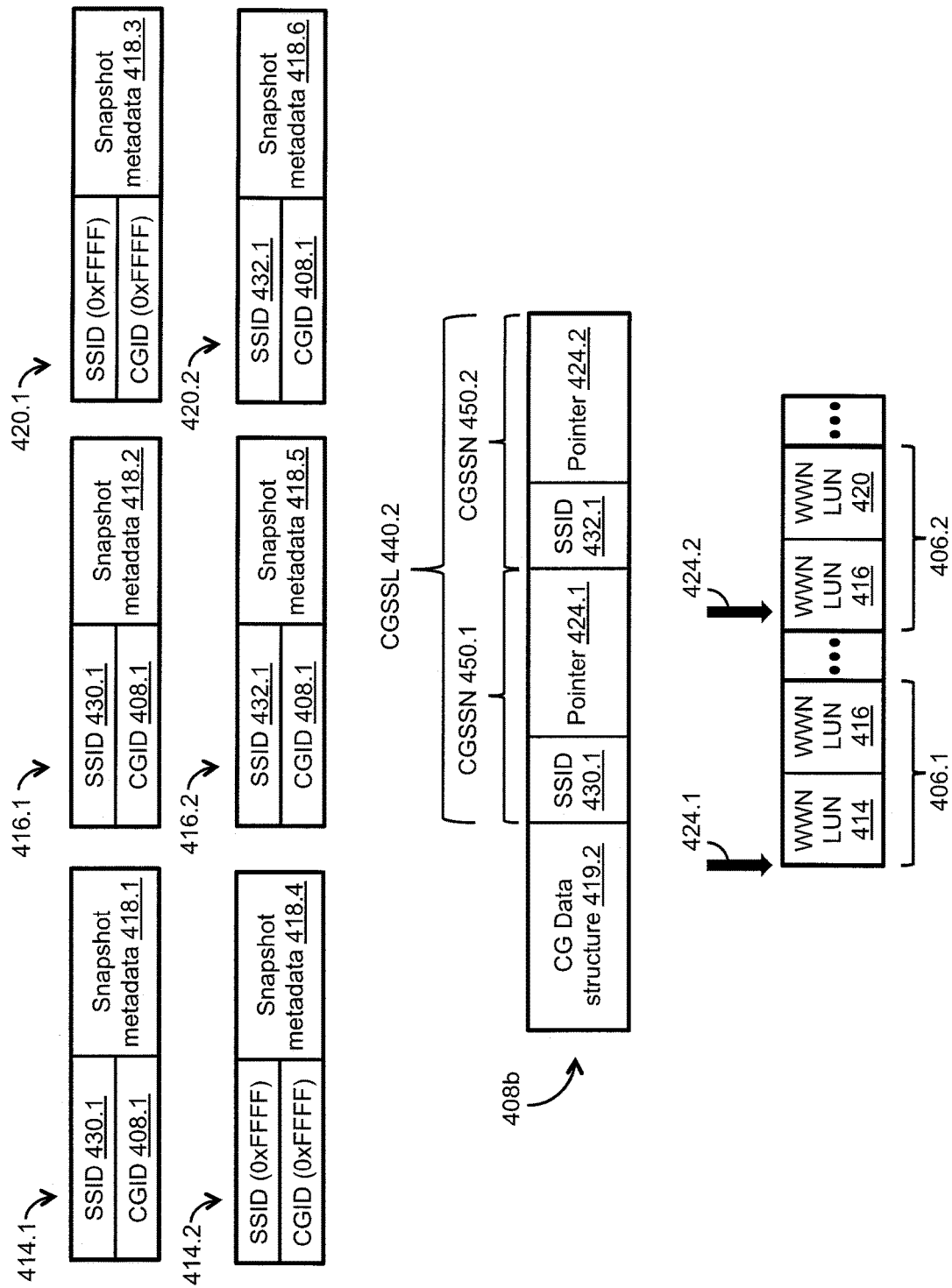
Figure 4C:
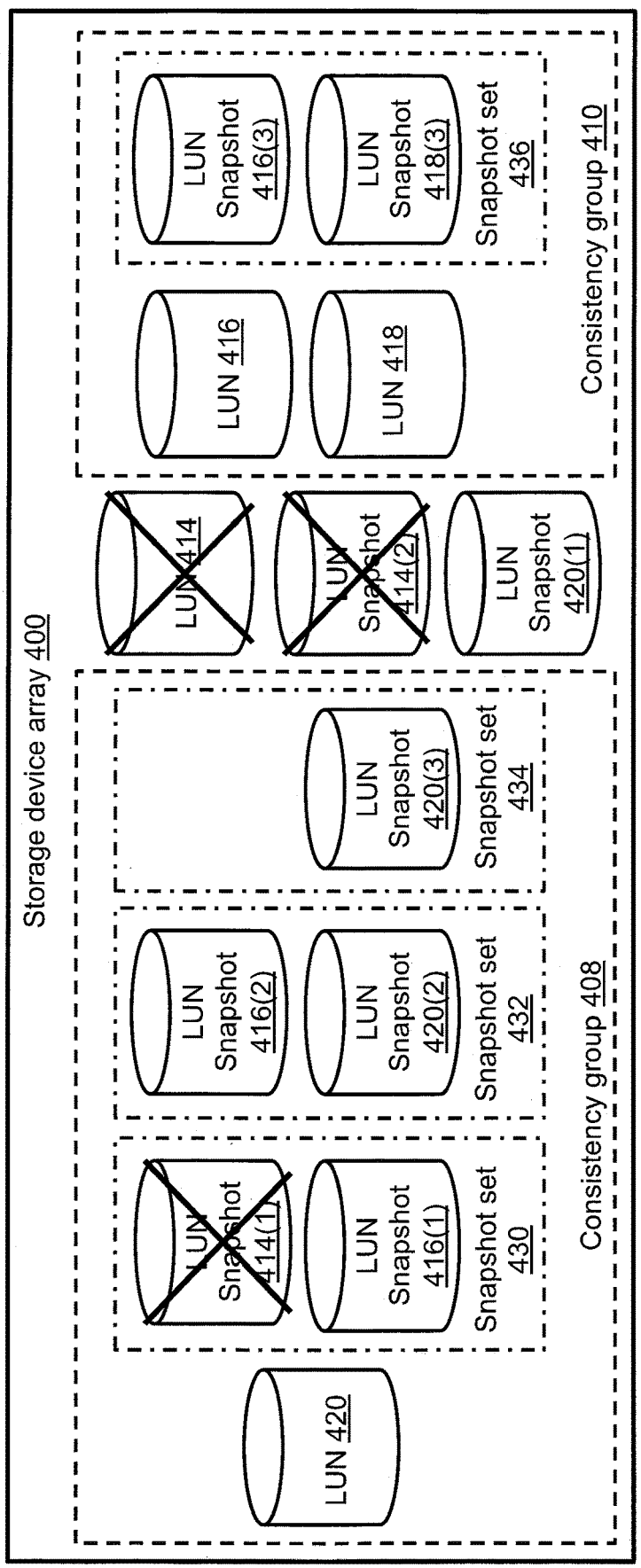
Figure 4C:
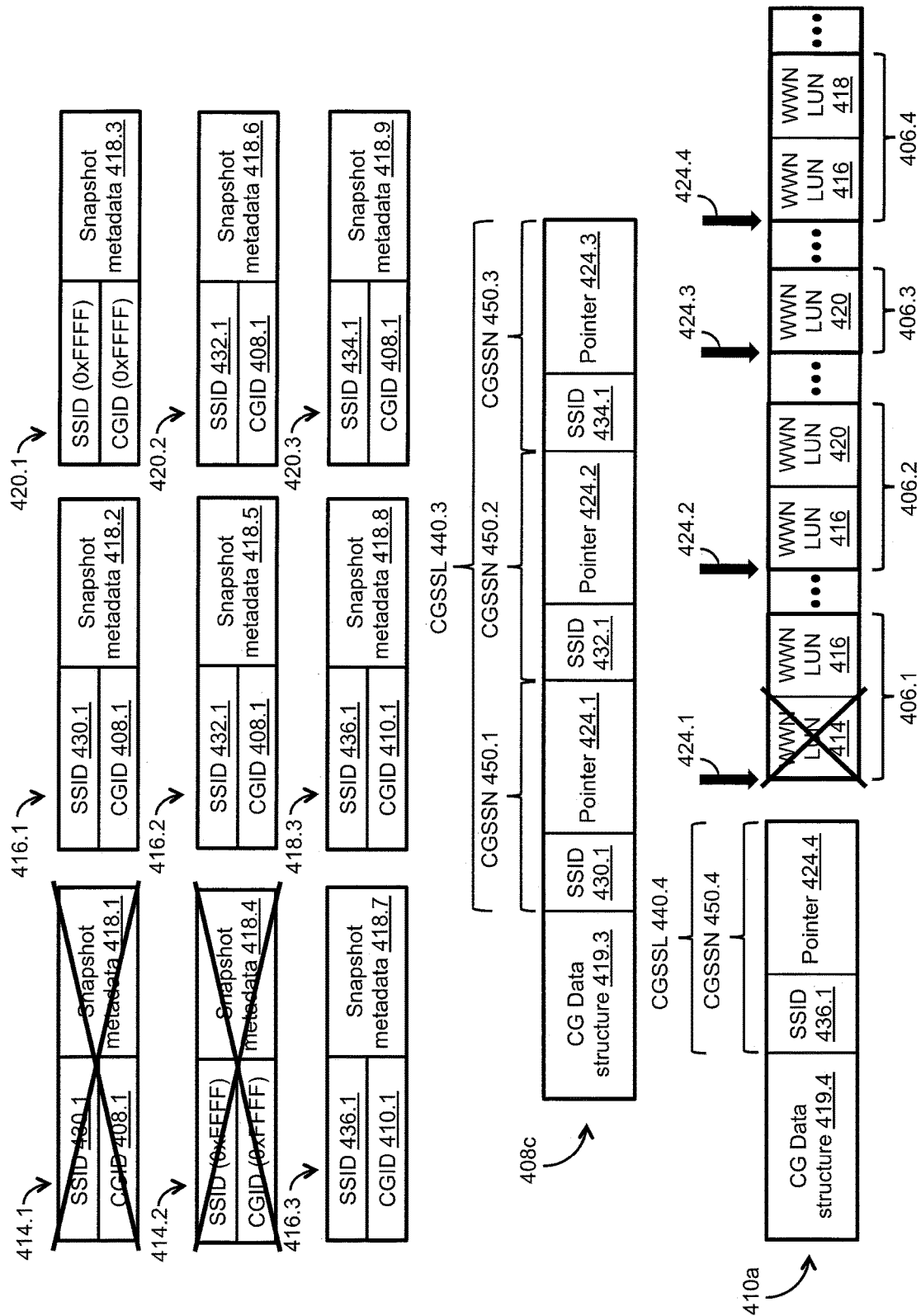

The operation of the data storage system 104 of FIG. 1 for implementing snapshot sets for consistency groups of storage volumes will be further understood with reference to the following illustrative example, as well as FIGS. 4a, 4b, and 4c. FIG. 4a depicts a storage device array 400 of a storage appliance within a data storage system (such as the data storage system 104) at a first PIT (also referred to herein as the "time T1"). At the time T1, the storage device array 400 is configured to store a plurality of storage volumes, namely, a LUN 414, a LUN 416, and a LUN 420, which has an associated LUN snapshot 420(1) taken at the time T1. The LUN 414 and the LUN 416 are provisioned in a consistency group 408, and the LUN 418 is provisioned in a consistency group 410. The consistency group 408 includes a snapshot set 430, which contains a LUN snapshot 414(1) and a LUN snapshot 416(1) of the LUN 414 and the LUN 416, respectively, each taken at the time T1. It is noted that the LUN 420 and its associated LUN snapshot 420(1) are not included in either of the consistency groups 408 and 410, or any other consistency group within the storage device array 400.

FIG. 4a (continued) depicts expanded snapshot metadata 414.1 and expanded snapshot metadata 416.1 for the LUN snapshot 414(1) and the LUN snapshot 416(1), respectively, in the snapshot set 430, and an enhanced consistency group data structure 408a for the consistency group 408 with the associated snapshot set 430. The expanded snapshot metadata 414.1 for the LUN snapshot 414(1) includes an SSID 430.1 for the snapshot set 430, a CGID 408.1 for the consistency group 408, and other snapshot metadata 418.1. The expanded snapshot metadata 416.1 for the LUN snapshot 416(1) includes the SSID 430.1 for the snapshot set 430, the CGID 408.1 for the consistency group 408, and other snapshot metadata 418.2. The enhanced consistency group data structure 408a for the consistency group 408 includes a CG data structure 419.1 and a CGSSL 440.1. The CGSSL 440.1 includes a single node, i.e., a CGSSN 450.1, containing the SSID 430.1 for the snapshot set 430, and a pointer 424.1 to a storage volume list 406.1 of names of the LUNs 414, 416 having the associated LUN snapshots 414 (1), 416(1), respectively, in the snapshot set 430. As shown in FIG. 4a (continued), the storage volume list 406.1 can include a worldwide name (WWN) of the LUN 414, and a worldwide name (WWN) of the LUN 416. In one embodiment, expanded snapshot metadata 420.1 for the LUN snapshot 420(1) (which is a standalone LUN snapshot that is not included in a snapshot set of a consistency group) can have a format like the expanded snapshot metadata 414.1 and the expanded snapshot metadata 416.1, with the exception that each of an SSID and a CGID of the expanded snapshot metadata 420.1 has a default value of 0xFFFF or any other suitable default value. As shown in FIG. 4a (continued), the expanded snapshot metadata 420.1 for the LUN snapshot 420(1) includes the SSID having the default value of 0xFFFF, the CGID having the same default value of 0xFFFF, and snapshot metadata 418.3.

FIG. 4b depicts the storage device array 400 of the storage appliance within the data storage system (such as the data storage system 104) at a second PIT (also referred to herein as the "time T2"). At the time T2, the data storage system operates to add the LUN 420 to the consistency group 408, while maintaining the LUN snapshot 420(1) outside of the consistency groups 408, 410. The data storage system further operates to remove the LUN 414 from the consistency group 408, while maintaining the LUN snapshot 414(1) in the snapshot set 430 of the consistency group 408. The data storage system also maintains the LUN 418 within the consistency group 410. In addition, the data storage system operates to create a snapshot set 432 containing a LUN snapshot 416(2) and a LUN snapshot 420(2) of the LUN 416 and the LUN 420, respectively, each taken at the time T2. The data storage system further operates to take a LUN snapshot 414(2) of the LUN 414 at the time T2. Like the LUN snapshot 420(1), the LUN snapshot 414(2) is maintained outside of the consistency groups 408, 410.

FIG. 4b (continued) depicts the expanded snapshot metadata 414.1 for the LUN snapshot 414(1), the expanded snapshot metadata 416.1 for the LUN snapshot 416(1), and the expanded snapshot metadata 420.1 for the LUN snapshot 420(1), as well as expanded snapshot metadata 416.2 and expanded snapshot metadata 420.2 for the LUN snapshot 416(2) and the LUN snapshot 420(2), respectively, in the snapshot set 432. The expanded snapshot metadata 416.2 for the LUN snapshot 416(2) includes an SSID 432.1 for the snapshot set 432, the CGID 408.1 for the consistency group 408, and other snapshot metadata 418.5. The expanded snapshot metadata 420.2 for the LUN snapshot 420(2) includes the SSID 432.1 for the snapshot set 432, the CGID 408.1 for the consistency group 408, and other snapshot metadata 418.6.

FIG. 4b (continued) further depicts an enhanced consistency group data structure 408b for the consistency group 408 that includes a CG data structure 419.2 and a CGSSL 440.2. The CGSSL 440.2 includes two (2) nodes, namely, the CGS SN 450.1 and a CGSSN 450.2. The CGSSN 450.1 contains the SSID 430.1 for the snapshot set 430 and the pointer 424.1 to the storage volume list 406.1. The CGSSN 450.2 contains the SSID 432.1 for the snapshot set 432 and a pointer 424.2 to a storage volume list 406.2 of names of the LUNs 416, 420 that have the associated LUN snapshots 416(2), 420(2), respectively, in the snapshot set 432. As shown in FIG. 4b (continued), the storage volume list 406.2 can include the worldwide name (WWN) of the LUN 416, and a worldwide name (WWN) of the LUN 420. In one embodiment, expanded snapshot metadata 414.2 for the LUN snapshot 414(2) (which is a standalone LUN snapshot that is not included in a snapshot set of a consistency group) can have a format like the expanded snapshot metadata 414.1, 416.1, 416.2, 420.2, with the exception that each of an SSID and a CGID of the expanded snapshot metadata 414.2 has a default value of 0xFFFF or any other suitable default value. As shown in FIG. 4b (continued), the expanded snapshot metadata 414.2 for the LUN snapshot 414(2) includes the SSID having the default value of 0xFFFF, the CGID having the same default value of 0xFFFF, and snapshot metadata 418.4.

In this example, the data storage system operates to add the LUN 420 to the consistency group 408, while maintaining the LUN snapshot 420(1) outside of the consistency group 408 and the snapshot set 430 within the consistency group 408. Unlike conventional data storage systems, the LUN 420 can be added to the consistency group 408 without having to delete the LUN snapshot 420(1), and/or to delete the LUN snapshot 414(1) and the LUN snapshot 416(1) in the snapshot set 430. This is because the data storage system provides (i) the expanded snapshot metadata 414.1 for the LUN snapshot 414(1), (ii) the expanded snapshot metadata 416.1 for the LUN snapshot 416(1), (iii) the expanded snapshot metadata 420.1 for the LUN snapshot 420(1), and (iv) the enhanced consistency group data structure 408*b* for the consistency group 408, which together allow relationships among the LUN snapshots 414(1), 416(1), 420(1), the snapshot set 430, the consistency group 408, and the LUNs 414, 416, 420 to be maintained in the storage device array 400 while the LUN 420 is being added to the consistency group 408, as well as after the LUN 420 has been added to the consistency group 408. It is noted that, once the LUN 420 has been added to the consistency group 408, only read requests and/or delete requests pertaining to the LUN snapshot 420(1) will be acted upon by the data storage system.

Moreover, the data storage system operates to remove the LUN 414 from the consistency group 408, while maintaining the snapshot sets 430, 432 within the consistency group 408. Unlike conventional data storage systems, the LUN 414 can be removed from the consistency group 408 without having to delete the LUN snapshot 414(1) and the LUN snapshot 416(1) in the snapshot set 430, and/or the LUN snapshot 416(2) and the LUN snapshot 420(2) in the snapshot set 432. This is because the data storage system provides (i) the expanded snapshot metadata 414.1 for the LUN snapshot 414(1), (ii) the expanded snapshot metadata 416.1 for the LUN snapshot 416(1), (iii) the expanded snapshot metadata 416.2 for the LUN snapshot 416(2), (iv) the expanded snapshot metadata 420.2 for the LUN snapshot 420(2), and (v) the enhanced consistency group data structure 408*b* for the consistency group 408, which together allow relationships among the LUN snapshots 414(1), 416(1), 416(2), 420(2), the snapshot sets 430, 432, the consistency group 408, and the LUNs 414, 416, 420 to be maintained in the storage device array 400 while the LUN 414 is being removed from the consistency group 408, as well as after the LUN 414 has been removed from the consistency group 408. It is noted that, once the LUN 414 has been removed from the consistency group 408, only read requests pertaining to the LUN snapshot 414(1) will be acted upon by the data storage system. In one embodiment, a delete operation pertaining to the LUN snapshot 414(1) will be performed by the data storage system in the event that (i) the snapshot set 430 is deleted, refreshed, or restored, (ii) the consistency group 408 is removed from the storage device array 400, or (iii) the LUN 414 is removed from the storage device array 400.

FIG. 4*c* depicts the storage device array 400 of the storage appliance within the data storage system (such as the data storage system 104) at a third PIT T3 (also referred to herein as the "time T3"). At the time T3, the data storage system operates to remove the LUN 414 from the storage device array 400 (as illustrated by an "X" on the LUN 414), to remove the LUN 416 from the consistency group 408, and to add the LUN 416 to the consistency group 410. In addition, the data storage system operates to create a snapshot set 434 containing a LUN snapshot 420(3) of the LUN 420 taken at the time T3, and to create a snapshot set 436 containing a LUN snapshot 416(3) of the LUN 416 and a LUN snapshot 418(3) of the LUN 418, each taken at the time T3.

FIG. 4*c* (continued) depicts the expanded snapshot metadata 414.1 for the LUN snapshot 414(1), the expanded snapshot metadata 416.1 for the LUN snapshot 416(1), the expanded snapshot metadata 420.1 for the LUN snapshot 420(1), the expanded snapshot metadata 414.2 for the LUN snapshot 414(2), the expanded snapshot metadata 416.2 for the LUN snapshot 416(2), and the expanded snapshot metadata 420.2 for the LUN snapshot 420(2), as well as expanded snapshot metadata 420.3 for the LUN snapshot 420(3) in the snapshot set 434, and expanded snapshot metadata 416.3 and expanded snapshot metadata 418.3 for the LUN snapshot 416(3) and the LUN snapshot 418(3), respectively, in the snapshot set 436. The expanded snapshot metadata 416.3 for the LUN snapshot 416(3) includes an SSID 436.1 for the snapshot set 436, the CGID 410.1 for the consistency group 410, and other snapshot metadata 418.7. The expanded snapshot metadata 418.3 for the LUN snapshot 418(3) includes the SSID 436.1 for the snapshot set 436, the CGID 410.1 for the consistency group 410, and other snapshot metadata 418.8. The expanded snapshot metadata 420.3 for the LUN snapshot 420(3) includes an SSID 434.1 for the snapshot set 434, the CGID 408.1 for the consistency group 408, and other snapshot metadata 418.9.

FIG. 4*c* (continued) further depicts an enhanced consistency group data structure 408*c* for the consistency group 408 that includes a CG data structure 419.3 and a CGSSL 440.3. The CGSSL 440.3 includes three (3) nodes, namely, the CGSSN 450.1, the CGSSN 450.2, and a CGSSN 450.3. The CGSSN 450.1 contains the SSID 430.1 for the snapshot set 430 and the pointer 424.1 to the storage volume list 406.1. The CGSSN 450.2 contains the SSID 432.1 for the snapshot set 432 and the pointer 424.2 to the storage volume list 406.2. The CGSSN 450.3 contains the SSID 434.1 for the snapshot set 434, and a pointer 424.3 to a storage volume list 406.3 of the name of the LUN 420 that has the associated LUN snapshot 420(3) in the snapshot set 434. As shown in FIG. 4*c* (continued), the storage volume list 406.3 can include the worldwide name (WWN) of the LUN 420. In addition, FIG. 4*c* (continued) depicts an enhanced consistency group data structure 410*a* for the consistency group 410 that includes a CG data structure 419.4 and a CGSSL 440.4. The CGSSL 440.4 includes a single node, namely, a CGSSN 450.4, which contains the SSID 436.1 for the snapshot set 436, and a pointer 424.4 to a storage volume list 406.4 of the names of the LUN 416 and the LUN 418, in which each of the LUNs 416, 418 has its associated LUN snapshot 416(3), 418(3), respectively, in the snapshot set 436. As shown in FIG. 4*c* (continued), the storage volume list 406.4 can include the worldwide name (WWN) of the LUN 416, and a worldwide name (WWN) of the LUN 418.

As described herein with reference to FIG. 4*c*, at the time T3, the data storage system operates to remove the LUN 414 from the storage device array 400 (as illustrated by an "X" on the LUN 414). Before removing the LUN 414, the data storage system accesses the expanded snapshot metadata 414.1 for the LUN snapshot 414(1) to determine the values of the CGID 408.1 and the SSID 430.1. Having determined the values of the CGID 408.1 and the SSID 430.1, the data storage system accesses the CGSSN 450.1 of the CGSSL 440.3 within the enhanced consistency group data structure 408*c*, navigates to the storage volume list 406.1 using the pointer 424.1, and deletes the name of the LUN 414 from the storage volume list 406.1 (as illustrated by an "X" on the WWN LUN 414). Further, the data storage system removes the LUN snapshot 414(1) from the snapshot set 430 of the consistency group 408 (as illustrated by an "X" on the LUN snapshot 414(1)), and deletes the expanded snapshot metadata 414.1 for the LUN snapshot 414(1) (as illustrated by an "X" on the expanded snapshot metadata 414.1). The data storage system also accesses the expanded snapshot metadata 414.2 for the LUN snapshot 414(2) to determine the values of the CGID and the SSID. Having determined that the values of the CGID and the SSID are each the default value of 0xFFFF, the data storage system determines that the LUN snapshot 414(2) is a standalone LUN snapshot, removes the LUN snapshot 414(2) from the storage device array 400 (as illustrated by an "X" on the LUN snapshot 414(2)), and deletes the expanded snapshot metadata 414.2 for the LUN snapshot 414(2) (as illustrated by an "X" on the expanded snapshot metadata 414.2).

In this example, the data storage system operates to remove the LUN 416 from the consistency group 408, and to add the LUN 416 to the consistency group 410, while maintaining the snapshot sets 430, 432, 434 within the consistency group 408. Unlike conventional data storage systems, the LUN 416 can be removed from the consistency group 408 (or added to the consistency group 410) without having to delete the LUN snapshot 414(1) and the LUN snapshot 416(1) in the snapshot set 430, to delete the LUN snapshot 416(2) and the LUN snapshot 420(2) in the snapshot set 432, and/or to delete the LUN snapshot 420(3) in the snapshot set 434. This is because the data storage system provides (i) the expanded snapshot metadata 414.1 for the LUN snapshot 414(1), (ii) the expanded snapshot metadata 416.1 for the LUN snapshot 416(1), (iii) the expanded snapshot metadata 416.2 for the LUN snapshot 416(2), (iv) the expanded snapshot metadata 420.2 for the LUN snapshot 420(2), (v) the expanded snapshot metadata 420.3 for the LUN snapshot 420(3), and (vi) the enhanced consistency group data structure 408c for the consistency group 408, which together allow relationships among the LUN snapshots 414(1), 416(1), 416(2), 420(2), 420(3), the snapshot sets 430, 432, 434, the consistency group 408, and the LUNs 414, 416, 420 to be maintained in the storage device array 400 while the LUN 416 is being removed from the consistency group 408 (or being added to the consistency group 410), as well as after the LUN 416 has been removed from the consistency group 408 (or has been added to the consistency group 410). It is noted that, once the LUN 416 has been added to the consistency group 410, only read requests pertaining to the LUN snapshot 416(1) and the LUN snapshot 416(2) will be acted upon by the data storage system. In one embodiment, a delete operation pertaining to the LUN snapshot 416(1) will be performed by the data storage system in the event that (i) the snapshot set 430 is deleted, refreshed, or restored, (ii) the consistency group 408 is removed from the storage device array 400, or (iii) the LUN 416 is removed from the storage device array 400. Similarly, a delete operation pertaining to the LUN snapshot 416(2) will be performed by the data storage system in the event that (i) the snapshot set 432 is deleted, refreshed, or restored, (ii) the consistency group 408 is removed from the storage device array 400, or (iii) the LUN 416 is removed from the storage device array 400.

Figure 5:
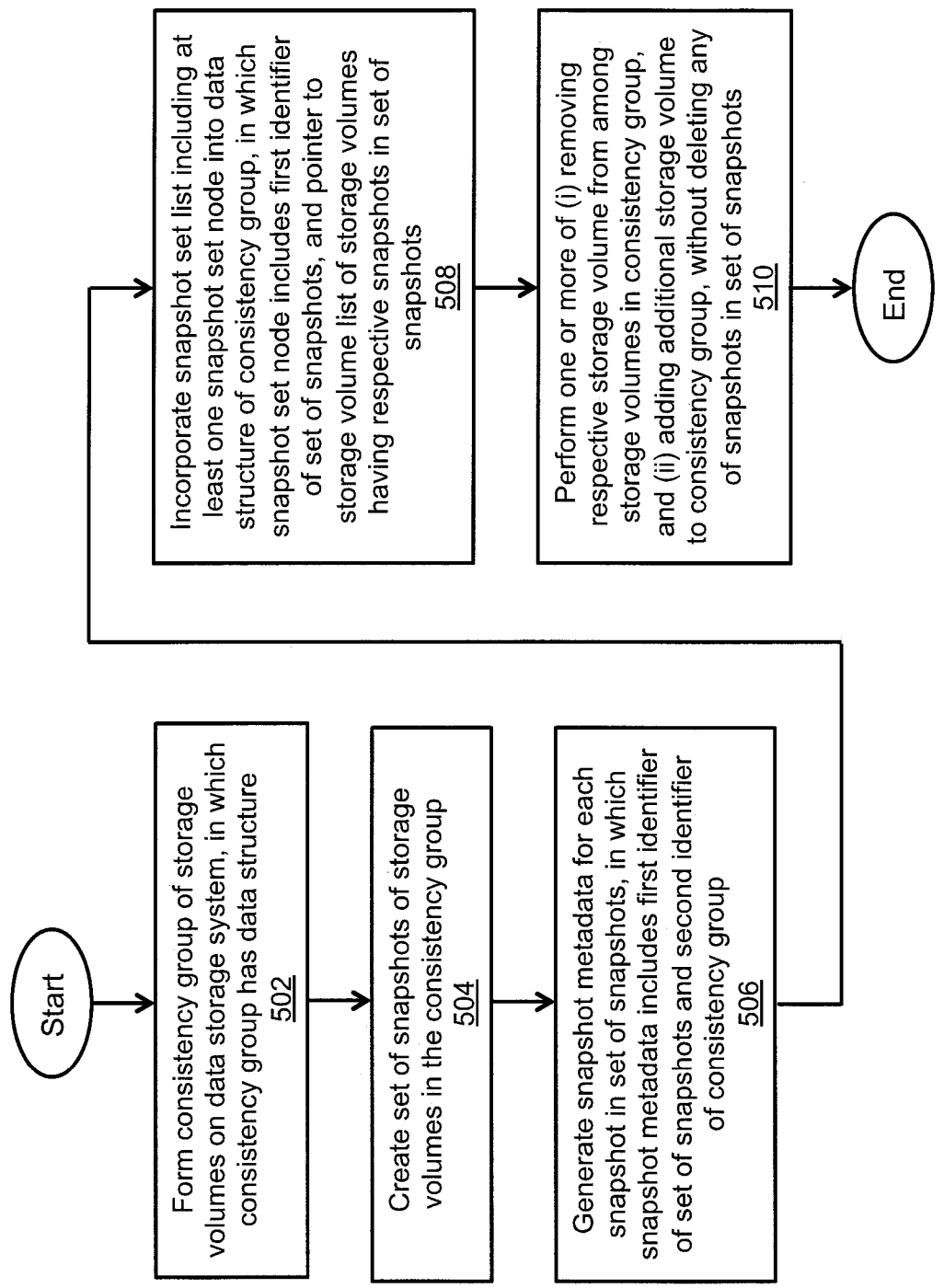
FIG. 5 is a flow diagram of an exemplary method of implementing snapshot sets for consistency groups of storage volumes stored on the data storage system of FIG. 1.

An exemplary method of implementing snapshot sets for consistency groups of storage volumes in a data storage system is described below with reference to FIG. 5. As depicted in block 502, a consistency group of storage volumes is formed on a data storage system, in which the consistency group has a data structure. As depicted in block 504, a set of snapshots of the storage volumes is created in the consistency group. As depicted in block 506, snapshot metadata is generated for each snapshot in the set of snapshots, in which the snapshot metadata includes a first identifier of the set of snapshots and a second identifier of the consistency group. As depicted in block 508, a snapshot set list including at least one snapshot set node is incorporated into the data structure of the consistency group, in which the snapshot set node includes the first identifier of the set of snapshots, and a pointer to a storage volume list of the storage volumes having the respective snapshots in the set of snapshots. As depicted in block 510, one or more of (i) removing a respective storage volume from among the storage volumes in the consistency group, and (ii) adding an additional storage volume to the consistency group, is performed without deleting any of the snapshots in the set of snapshots.

Having described the above illustrative embodiments, other alternative embodiments or variations may be made and/or practiced. For example, it was described herein that snapshots of storage volumes in a snapshot set of a consistency group could be deleted, refreshed, and/or restored. In certain embodiments, if a storage volume that has a snapshot in the snapshot set is removed from the consistency group, and a refresh operation is performed on the snapshot set, then (i) the snapshot of the removed storage volume is deleted from the snapshot set (and the name of the removed storage volume is deleted from the list of storage volumes having snapshots in the snapshot set), and (ii) the refresh operation if performed on the remaining snapshots in the snapshot set. In further embodiments, if a delete operation is performed on the snapshot set, then all of the snapshots in the snapshot set are deleted (and the CGSSN that includes the SSID of the snapshot set, as well as the storage volume list pointed to by the pointer included in the CGSSN, are deleted from the CGSSL for the consistency group).

In other embodiments, if a restore operation is to be performed on the snapshot set that includes the snapshot of the removed storage volume, then a user of the data storage system is provided, such as via a graphical user interface (GUI) of the data storage system, the option of (i) discarding the snapshot of the removed storage volume, or (ii) adding the removed storage volume back to the consistency group. If the user chooses to discard the snapshot of the removed storage volume, then (i) the snapshot of the removed storage volume is deleted from the snapshot set (and the name of the removed storage volume is deleted from the list of storage volumes having snapshots in the snapshot set), and (ii) the restore operation is performed on the remaining snapshots in the snapshot set. If the user chooses to add the removed storage volume back to the consistency group, then the restore operation is performed on all of the snapshots in the snapshot set, including the snapshot of the storage volume that was previously removed from and subsequently added back to the consistency group (and the CGSSN that includes the SSID of the snapshot set, as well as the storage volume list pointed to by the pointer included in the CGSSN, are updated to reflect the addition of the storage volume to the consistency group).

It is noted that the disclosed systems and methods or portions thereof may be embodied as a computer program product including one or more non-transient, computer-readable storage media, such as a magnetic disk, magnetic tape, compact disk, DVD, optical disk, flash drive, solid state drive (SSD), Secure Digital (SD) chip or device, Application Specific Integrated Circuit (ASIC), Field Programmable Gate Array (FPGA), and/or the like. Any number of computer-readable media may be used. The media may be encoded with instructions that, when executed on one or more computers or other processors, perform the process or processes described herein. Such media may be considered articles of manufacture or machines, and may be transportable from one machine to another.

While various embodiments of the invention have been particularly shown and described, it will be understood by those skilled in the art that various changes in form and details may be made therein without departing from the scope of the invention as defined by the appended claims.

What is claimed is:

1. A method of implementing snapshot sets for consistency groups of storage volumes in a data storage system, comprising:

forming a consistency group of storage volumes on the data storage system, the consistency group having a data structure;

creating, at a first point-in-time (PIT), a first set of snapshots of the storage volumes in the consistency group;

generating first snapshot metadata for each snapshot in the first set of snapshots, the first snapshot metadata including an identifier of the first set of snapshots and an identifier of the consistency group;

incorporating a snapshot set list including a first snapshot set node into the data structure of the consistency group, the first snapshot set node including the identifier of the first set of snapshots and a first pointer to a first storage volume list of the storage volumes having the respective snapshots in the first set of snapshots;

adding an additional storage volume to the consistency group, without deleting any of the snapshots in the first set of snapshots in the consistency group, a snapshot of the additional storage volume being stored on the data storage system outside of the consistency group; and having added the additional storage volume to the consistency group, allowing only read requests or delete requests pertaining to the snapshot of the additional storage volume to be acted upon by the data storage system.

2. The method of claim 1 further comprising:

having added the additional storage volume to the consistency group, creating, at a second PIT, a second set of snapshots of the storage volumes including the additional storage volume in the consistency group.

3. The method of claim 2 further comprising:

generating second snapshot metadata for each snapshot in the second set of snapshots, the second snapshot metadata including an identifier of the second set of snapshots and the identifier of the consistency group.

4. The method of claim 3 further comprising:

adding a second snapshot set node to the snapshot set list, the second snapshot set node including an identifier of the second set of snapshots and a second pointer to a second storage volume list of storage volumes having the respective snapshots in the second set of snapshots.

5. The method of claim 1 further comprising:

removing a respective storage volume from among the storage volumes in the consistency group, without deleting any of the snapshots in the first set of snapshots in the consistency group; and having removed the respective storage volume from among the storage volumes in the consistency group, allowing only read requests pertaining to the snapshot of the respective storage volume to be acted upon by the data storage system.

6. The method of claim 5 further comprising:

deleting the snapshot of the respective storage volume in the event that (i) the first set of snapshots is deleted, refreshed, or restored, (ii) the consistency group is removed from the data storage system, or (iii) the respective storage volume is removed from the data storage system.

7. The method of claim 5 wherein the respective storage volume is initially stored on the data storage system outside of the consistency group, and wherein the method further comprises:

subsequently removing the respective storage volume from the data storage system.

8. The method of claim 7 further comprising:

before removing the respective storage volume from the data storage system, accessing the first snapshot metadata for the snapshot of the respective storage volume to obtain the identifier of the first set of snapshots and the identifier of the consistency group.

9. The method of claim 8 further comprising:

having obtained the identifier of the first set of snapshots and the identifier of the consistency group, accessing the first snapshot set node of the snapshot set list incorporated into the data structure of the consistency group, and accessing the first storage volume list using the first pointer included in the first snapshot set node.

10. A method of implementing snapshot sets for consistency groups of storage volumes in a data storage system, comprising:

forming a consistency group of storage volumes on the data storage system, the consistency group having a data structure;

creating, at a first point-in-time (PIT), a first set of snapshots of the storage volumes in the consistency group;

generating first snapshot metadata for each snapshot in the first set of snapshots, the first snapshot metadata including an identifier of the first set of snapshots and an identifier of the consistency group;

incorporating a snapshot set list including a first snapshot set node into the data structure of the consistency group, the first snapshot set node including the identifier of the first set of snapshots and a first pointer to a first storage volume list of the storage volumes having the respective snapshots in the first set of snapshots;

removing a respective storage volume from among the storage volumes in the consistency group, without deleting any of the snapshots in the first set of snapshots in the consistency group;

having removed the respective storage volume from among the storage volumes in the consistency group, allowing only read requests pertaining to the snapshot of the respective storage volume to be acted upon by the data storage system, the respective storage volume being initially stored on the data storage system outside of the consistency group;

accessing the first snapshot metadata for the snapshot of the respective storage volume to obtain the identifier of the first set of snapshots and the identifier of the consistency group;

having obtained the identifier of the first set of snapshots and the identifier of the consistency group, accessing the first snapshot set node of the snapshot set list incorporated into the data structure of the consistency group, and accessing the first storage volume list using the first pointer included in the first snapshot set node;

removing the respective storage volume from the data storage system; and deleting a name of the respective storage volume from the first storage volume list.

11. The method of claim 10 further comprising:
deleting the snapshot of the respective storage volume from the consistency group, and deleting the first snapshot metadata for the snapshot of the respective storage volume.

12. The method of claim 1 further comprising:
forming a second consistency group of storage volumes on the data storage system, the second consistency group having a second data structure;
creating, at a second PIT, a second set of snapshots of the storage volumes in the second consistency group;
generating second snapshot metadata for each snapshot in the second set of snapshots, the second snapshot metadata including an identifier of the second set of snapshots and an identifier of the second consistency group; and
incorporating a second snapshot set list including a snapshot set node into the second data structure of the second consistency group, the snapshot set node including the identifier of the second set of snapshots and a second pointer to a second storage volume list of the storage volumes having the respective snapshots in the second set of snapshots.

13. A system for implementing snapshot sets for consistency groups of storage volumes in a data storage system, comprising:
at least one memory; and
at least one processor operative to execute instructions out of the at least one memory:
to form a consistency group of storage volumes on the data storage system, the consistency group having a data structure;
to create, at a first point-in-time (PIT), a first set of snapshots of the storage volumes in the consistency group;
to generate first snapshot metadata for each snapshot in the first set of snapshots, the first snapshot metadata including an identifier of the first set of snapshots and an identifier of the consistency group;
to incorporate a snapshot set list including a first snapshot set node into the data structure of the consistency group, the first snapshot set node including the identifier of the first set of snapshots and a first pointer to a first storage volume list of the storage volumes having the respective snapshots in the first set of snapshots;
to add an additional storage volume to the consistency group, without deleting any of the snapshots in the first set of snapshots in the consistency group, a snapshot of the additional storage volume being stored on the data storage system outside of the consistency group; and
having added the additional storage volume to the consistency group, to allow only read requests or delete requests pertaining to the snapshot of the additional storage volume to be acted upon by the data storage system.

14. The system of claim 13 wherein the at least one processor is further operative to execute the instructions out of the at least one memory:
to remove a respective storage volume from among the storage volumes in the consistency group, without deleting any of the snapshots in the first set of snapshots in the consistency group; and
having removed the respective storage volume from among the storage volumes in the consistency group, to allow only read requests pertaining to the snapshot of the respective storage volume to be acted upon by the data storage system.

15. The system of claim 13 wherein the at least one processor is further operative to execute the instructions out of the at least one memory:
to form a second consistency group of storage volumes on the data storage system, the second consistency group having a second data structure;
to create, at a second PIT, a second set of snapshots of the storage volumes in the second consistency group;
to generate second snapshot metadata for each snapshot in the second set of snapshots, the second snapshot metadata including an identifier of the second set of snapshots and an identifier of the second consistency group; and
to incorporate a second snapshot set list including a snapshot set node into the second data structure of the second consistency group, the snapshot set node including the identifier of the second set of snapshots and a second pointer to a second storage volume list of the storage volumes having the respective snapshots in the second set of snapshots.

16. A computer program product having a non-transitory computer readable medium that stores a set of instructions to implement snapshot sets for consistency groups of storage volumes in a data storage system, the set of instructions, when carried out by computerized circuitry, causing the computerized circuitry to perform a method of:
forming a consistency group of storage volumes on the data storage system, the consistency group having a data structure;
creating, at a first point-in-time (PIT), a first set of snapshots of the storage volumes in the consistency group;
generating first snapshot metadata for each snapshot in the first set of snapshots, the first snapshot metadata including an identifier of the first set of snapshots and an identifier of the consistency group;
incorporating a snapshot set list including a first snapshot set node into the data structure of the consistency group, the first snapshot set node including the identifier of the first set of snapshots and a first pointer to a first storage volume list of the storage volumes having the respective snapshots in the first set of snapshots;
adding an additional storage volume to the consistency group, without deleting any of the snapshots in the first set of snapshots in the consistency group, a snapshot of the additional storage volume being stored on the data storage system outside of the consistency group; and
having added the additional storage volume to the consistency croup, allowing only read requests or delete requests pertaining to the snapshot of the additional storage volume to be acted upon by the data storage system.

17. The method of claim 16 further comprising:
removing a respective storage volume from among the storage volumes in the consistency group, without deleting any of the snapshots in the first set of snapshots in the consistency group; and
having removed the respective storage volume from among the storage volumes in the consistency group, allowing only read requests pertaining to the snapshot of the respective storage volume to be acted upon by the data storage system.

* * * * *